Patented Nov. 10, 1942

2,301,756

UNITED STATES PATENT OFFICE 2,301,756

POWDER METAL BEARING AND METHOD OF MAKING THE SAME

Richard S. Shutt, Columbus, Ohio, assignor to Battelle Memorial Institute, Columbus, Ohio, a corporation of Ohio No Drawing. Application March 5, 1941, Serial No. 381,889

4 Claims. (Cl. 75—22)

My invention relates to powder metal bearings and method of making the same. It has to do, more particularly, with the production, by powder metallurgy methods, of porous metal bearing materials with improved properties over such materials of this type as are now available.

Powder metallurgy methods have been known for a comparatively long time. According to these methods, powdered metals are compacted into the desired forms under proper conditions and then are sintered at elevated temperatures to form a strong, coherent unit. Because of the comparatively high sintering temperature, for example 1700° to 2000° F. in the case of iron base articles, it has been thought impossible hitherto to retain volatile materials within powdered metal compacts during the sintering operation.

In the prior art porous metal bearings have been prepared from mixtures of powders of: copper and tin; copper, tin and graphite; iron and copper; iron and graphite; iron, copper and graphite; and many other combinations of metal powders. The specific pressing and sintering temperatures used are dependent on the composition of the bearing being made.

For service where the oil supply may fail or oiling is infrequent, graphite-containing porous metal bearings have been found to be quite useful, the graphite appearing to improve the lubricating properties of the bearing. Such bearings must have good porosity to enable them to store lubricant and good pore continuity so that oil may be drawn to the bearing surface from all parts of the bearing. Adequate mechanical strength must also be obtained in the finished bearing but from the standpoint of lubrication, porosity and pore continuity are the important factors. These two factors are controlled by the forming pressure, the character of the materials which make up the bearing, and the sintering conditions. In the past, volatile compounds have frequently been added to the mix so that sintering drives these compounds off, leaving a porous bearing with good pore continuity. By such a method high forming pressures may be used, with resultant high mechanical strength in the finished bearing without causing an undue decrease in the porosity of the bearing. However, in all of these cases the volatile material was completely displaced from the finished product.

A particular object of my invention is the production of porous metal bearings which possess not only the porosity and pore continuity desired for the retention of oil for lubricating purposes but also superior anti-friction properties under service conditions of starved lubrication, i. e. with no oil used for lubrication except that contained in the porous material from prior addition.

A further object of my invention is the production of a bearing material which contains a material capable of producing on the usual shafting used with such a bearing a film which improves lubrication and tends to prevent galling and seizing under conditions of limited lubrication.

Still another object of my invention is the production of a bearing having good porosity and pore continuity.

Another object of my invention is to provide a simple and effective method for producing a bearing material of the type indicated.

I have found that by using selenium in a powder metal material the above-indicated objects are attained. I have found that selenium, which is volatile at the usual sintering temperatures, having a boiling point of only 1274° F. (690° C.), may be practically completely retained in the finished bearing produced according to my process. The use of selenium results in a product superior, under starved lubrication conditions, to the graphite-containing bearings now available.

According to this invention, selenium has been incorporated in a ferrous-base powdered metal bearing. For comparison, bearings containing graphite were made up under the same conditions as the selenium-containing bearings of this invention. These graphite-containing bearings represent the state of the art at the present time and so provide a basis for comparison.

Porous iron bearings were made by adding selenium, graphite and mixtures of the two, to powdered Swedish sponge iron. These mixtures were lubricated for compacting or pressing by the addition of 3% of stearic acid and compacted at 40,000 p. s. i. Pressed bars were sintered in a hydrogen atmosphere and tested for transverse strength and change in length. The results were as shown in the following table.

TABLE.—*Comparison of powdered iron bearing materials*

| Bearing composition | | | Group I | | | | Group I | | | |
| --- | --- | --- | --- | --- | --- | --- | --- | --- | --- | --- |
| Fe | Se | Graphite | Sintering conditions | Linear change in length | Loss of Se or graphite on sintering | Transverse bend test mod. of rupture | Sintering conditions | Linear change in length | Loss of Se or graphite on sintering | Transverse bend test mod. of rupture |
| Per cent | Per cent | | | In./in. | Per cent | P. s. i. | | In./in. | Per cent | P. s. i. |
| 100 | | | 1870° F.–1 hr | –.0045 | | 13,100 | 2050° F.–1 hr | –.0080 | | 23,800 |
| 98 | 2 | | ----do---- | –.0002 | None | 11,300 | ----do---- | –.0040 | None | 13,650 |
| 95 | 5 | | ----do---- | +.0002 | 10.5% Se | 11,000 | ----do---- | +.0050 | 23% Se | 10,800 |
| 98 | | 2 | ----do---- | +.0002 | 57% graphite | 4,300 | ----do---- | –.0045 | 56% graphite | 29,200 |
| 96 | 2 | 2 | ----do---- | +.0025 | 0% Se [1] | 7,560 | ----do---- | –.0020 | 0% Se [1] | 26,200 |
| 93 | 5 | 2 | ----do---- | +.0042 | 3% Se [1] | 7,350 | ----do---- | +.0043 | 17% Se [1] | 19,200 |

[1] Selenium loss calculated by assuming 50% of graphite addition lost.

It will be seen that it was possible to sinter selenium-containing bearings without loss of selenium even under conditions where considerable graphite was lost. The strength of the sintered compact was more dependent upon the sintering temperature than upon the lubrication addition agent, although at the lower temperature it is clear that selenium is less detrimental to the strength of the sintered compact than graphite. From the length changes it is apparent that selenium is fully as effective as graphite in preventing shrinkage. The amount of selenium used depends on the use for which the bearing is designed but will not ordinarily exceed 10% and, where graphite is used in conjunction with the selenium, the graphite will not be used in amounts greater than 10%.

The important feature of my invention is that it produces porous, powder metal bearings having adequate physical properties and superior anti-friction qualities under starved lubrication conditions.

Other advantages will be apparent from the preceding description and the following claims.

Having thus described my invention, what I claim is:

1. A porous bearing having superior antifriction properties under service conditions of starved lubrication made of sintered ferrous-base powdered metals containing selenium in effective amounts up to 10 per cent, said selenium being capable of producing a film having lubricant properties upon a shaft with which the bearing is used.

2. A porous bearing having superior antifriction properties under service conditions of starved lubrication made of sintered powdered metals consisting of 0.5 to 5 per cent selenium and the balance substantially all iron, said selenium being capable of producing a film having lubricant properties upon a shaft with which the bearing is used.

3. A porous bearing having superior antifriction properties under service conditions of starved lubrication made of sintered powdered metals consisting of 0.5 to 5 per cent selenium, up to 2 per cent graphite and the balance substantially all iron, said selenium being capable of producing a film having lubricant properties upon a shaft with which the bearing is used.

4. The process of preparing a porous bearing material having superior antifriction properties under service conditions of starved lubrication which comprises mixing selenium in effective amounts up to 10 per cent with ferrous-base powdered metals, compacting the mix, and sintering at a temperature above the boiling point of selenium.

RICHARD S. SHUTT.